United States Patent
Vandapel (10) Patent No.: US 9,889,850 B2
(45) Date of Patent: Feb. 13, 2018

(54) SYSTEM FOR CONTROLLING OPERATION OF A MACHINE

(71) Applicant: Caterpillar Inc., Peoria, IL (US)

(72) Inventor: Nicolas François-Xavier Christophe Vandapel, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 164 days.

(21) Appl. No.: 15/053,279

(22) Filed: Feb. 25, 2016

(65) Prior Publication Data

US 2017/0247033 A1   Aug. 31, 2017

(51) Int. Cl.

| | |
|---|---|
| G01C 22/00 | (2006.01) |
| B60W 30/18 | (2012.01) |
| B60W 10/04 | (2006.01) |
| B60W 10/18 | (2012.01) |
| B60W 10/20 | (2006.01) |
| G05B 15/02 | (2006.01) |
| G05D 1/00 | (2006.01) |
| B60P 3/06 | (2006.01) |
| B62D 55/06 | (2006.01) |

(52) U.S. Cl.
CPC ...... B60W 30/18009 (2013.01); B60W 10/04 (2013.01); B60W 10/18 (2013.01); B60W 10/20 (2013.01); G05B 15/02 (2013.01); G05D 1/0088 (2013.01); *B60P 3/062* (2013.01); *B60W 2420/00* (2013.01); *B62D 55/06* (2013.01)

(58) Field of Classification Search
CPC .................. B60W 30/18009; B60W 10/04
See application file for complete search history.

(56) References Cited

U.S. PATENT DOCUMENTS

| | | | |
|---|---|---|---|
| 9,156,496 B2 * | 10/2015 | Greenwood | .............. B60R 1/00 |
| 9,683,848 B2 * | 6/2017 | Lavoie | ................. G01C 21/165 |
| 2014/0205403 A1 | 7/2014 | Criswell | |

FOREIGN PATENT DOCUMENTS

CN        204013912        12/2014

\* cited by examiner

*Primary Examiner* — Adam Alharbi (57) ABSTRACT

A perception system for an autonomous machine to be hauled by a towing vehicle includes sensors that are configured to determine characteristics of an environment associated with the machine. Such characteristics associated with the machine include at least structural characteristics of the towing vehicle. The sensors are further configured to detect a presence of the towing vehicle on a job site, an orientation of the towing vehicle on the job site, and a loading end of the towing vehicle. The perception system further includes a controller that is communicably coupled to each of the sensors. The controller is configured to actuate movement of the machine in relation to the towing vehicle based on the characteristics of the environment determined by the sensors.

15 Claims, 6 Drawing Sheets

SYSTEM FOR CONTROLLING OPERATION OF A MACHINE

TECHNICAL FIELD

The present disclosure generally relates to a system for controlling operation of a machine. More particularly, the present disclosure relates to a perception system for an autonomous machine.

BACKGROUND

Heavy industrial mobile machinery used in applications such as, but not limited to, construction, mining, agriculture, and forestry are typically transported to a work-site using transportation vehicles such as trucks, haulers, and trailers. In some cases, these mobile machines may be configured to operate autonomously when performing the required functions at the work site. However, a loading of such autonomous mobile equipment and machines onto transportation machinery or vehicles and subsequent unloading thereof may still continue to require operators as such machines may not be pre-configured with the required set of capabilities to autonomously load and unload themselves in relation to the transportation equipment.

U.S. Publication 2014/0205403 (hereinafter referred to as "the '403 publication") relates to an automatic truck unloader for unloading/unpacking products, such as boxes or cases, from trailers and containers. However, the '403 publication does not account for using existing machine capabilities in a machine to autonomously perform loading or unloading, by itself, onto and from a transportation vehicle.

Hence, there is a need for a system that allows a machine to autonomously, load or unload, itself onto or from a transportation vehicle.

SUMMARY OF THE DISCLOSURE

In one aspect of the present disclosure, a perception system for an autonomous machine to be hauled by a towing vehicle includes sensors that are configured to determine characteristics of an environment associated with the machine. Such characteristics associated with the machine include at least structural characteristics of the towing vehicle. The sensors are further configured to detect at least one of: a presence of the towing vehicle on a job site, an orientation of the towing vehicle on the job site, and a loading end of the towing vehicle. The perception system further includes a controller that is communicably coupled to each of the sensors. The controller is configured to actuate movement of the machine in relation to the towing vehicle based on the characteristics of the environment determined by the sensors.

In another aspect of the present disclosure, a machine includes a frame, and at least one ground engaging member rotatably coupled to the frame, the at least one ground engaging member being configured to selectively propel the machine in relation to a towing vehicle. The machine further multiple sensors that are disposed on the frame. The sensors are configured to determine characteristics of an environment associated with the machine, the characteristics associated with the machine being inclusive of at least structural characteristics of the towing vehicle. Moreover, the sensors are configured to detect at least one of a presence of the towing vehicle on a job site; an orientation of the towing vehicle on the job site; and a loading end of the towing vehicle. The machine further includes a controller that is communicably coupled to each of the sensors. The controller is configured to actuate movement of the machine in relation to the towing vehicle based on the characteristics of the environment determined by the sensors.

In yet another aspect of the present disclosure, a method of guiding movement of a machine in relation to a towing vehicle includes determining, by sensors, characteristics of an environment associated with the machine, the determined characteristics of the environment being inclusive of at least structural characteristics of the towing vehicle; and actuating movement of the machine, by a controller, in relation to the towing vehicle based on the characteristics of the environment determined by the sensors, the controller being communicably coupled to the sensors.

Other features and aspects of this disclosure will be apparent from the following description and the accompanying drawings.

BRIEF DESCRIPTION OF THE DRAWINGS

The features and advantages of the present disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

DETAILED DESCRIPTION

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the operating systems) may not be described in detail herein. Furthermore, the connecting lines shown in the various figures contained herein are intended to represent exemplary functional relationships and/or physical/communicative couplings between the various elements. It should be noted that many alternative or additional functional relationships or physical/communicative connections may be present in a practical system.

The present disclosure is described herein with reference to system architecture, block diagrams and flowchart illustrations of methods, and computer program products according to various aspects of the disclosure. It will be understood that each functional block of the block diagrams, the flowchart illustrations, and combinations of functional blocks in the block diagrams, the flowchart illustrations, and combinations of functional blocks in the block diagrams, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce output/s that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described as being combined into a single step for the sake of simplicity may be expanded into multiple steps. In other cases, steps illustrated and described as single process steps may be separated into multiple steps but have been combined for simplicity.

It may be further noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

The systems, methods and computer program products disclosed in conjunction with various embodiments of the present disclosure are embodied in systems, modules, and methods for controlling operation of a machine. Specific nomenclature used herein is merely exemplary and only used for descriptive purposes. Hence, such nomenclature must not be construed as being limiting of the scope of the present disclosure.

The present disclosure is now described in more detail herein in terms of the above disclosed exemplary embodiments of system, methods, processes and computer program products. This is for convenience only and is not intended to limit the application of the present disclosure. In fact, after reading the following description, it will be apparent to one skilled in the relevant art(s) how to implement the following disclosure in alternative embodiments.

Figure 1:
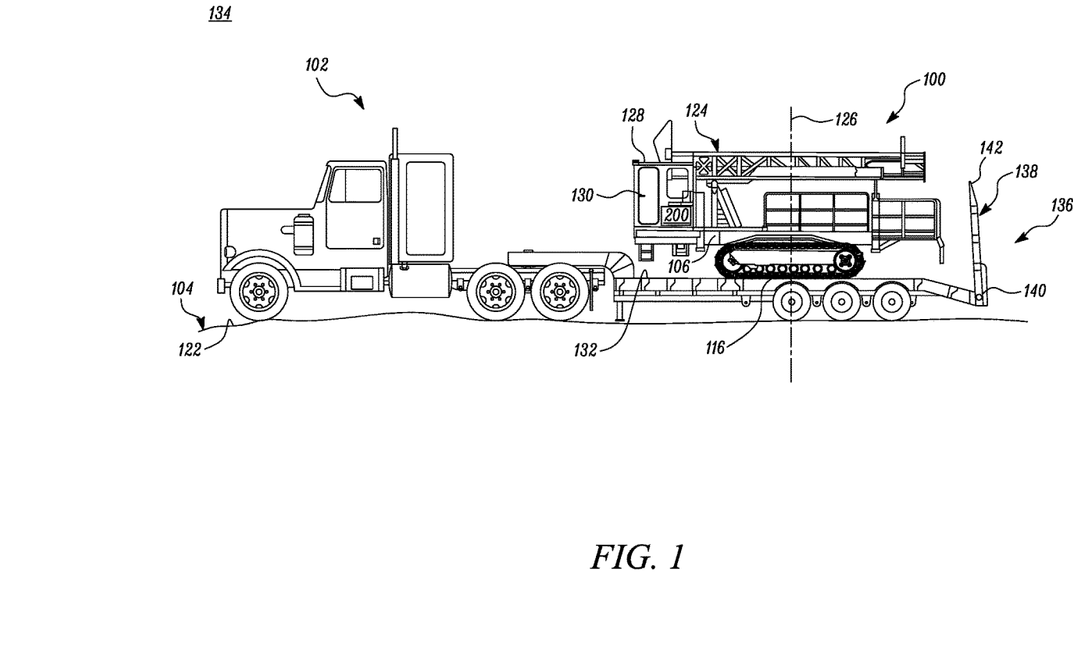
FIG. 1 is a side view of an exemplary machine being hauled by an exemplary towing vehicle, in accordance with embodiments of the present disclosure.

With reference to FIG. 1, an exemplary machine 100 is depicted, in which embodiments of the present disclosure may be implemented. As shown, the machine 100 is embodied in the form of a drill and is shown loaded onto a towing vehicle 102. The machine 100 may be used in a variety of applications including mining, quarrying, road construction, construction site preparation, etc. For example, the drill of the present disclosure may be employed for penetrating earth materials such as ore, soil, debris, or other naturally occurring deposits from a job site 104; and for defining one or more openings (not shown) in such earth materials.

Although the exemplary machine 100 is embodied as a drill in the illustrated embodiment of FIG. 1, it will be appreciated that the other types of machines such as, for e.g., but not limited to, shovels, diggers, buckets, hydraulic excavators, motor graders, and the like can be optionally used in lieu of the drill disclosed herein to implement the embodiments of the present disclosure. Moreover, for purposes of the present disclosure, the machine 100 may be regarded as an autonomous machine. However, in alternative embodiments of the present disclosure, the machine 100 can optionally be embodied in the form of a manually-operated machine, or a machine that is operable in both manual and autonomous mode for e.g., a semi-autonomous mode. Therefore, notwithstanding any particular configuration of machine 100 disclosed in this document, it may be noted that embodiments disclosed herein can be similarly applied to other types of machines without deviating from the spirit of the present disclosure.

Figure 2:
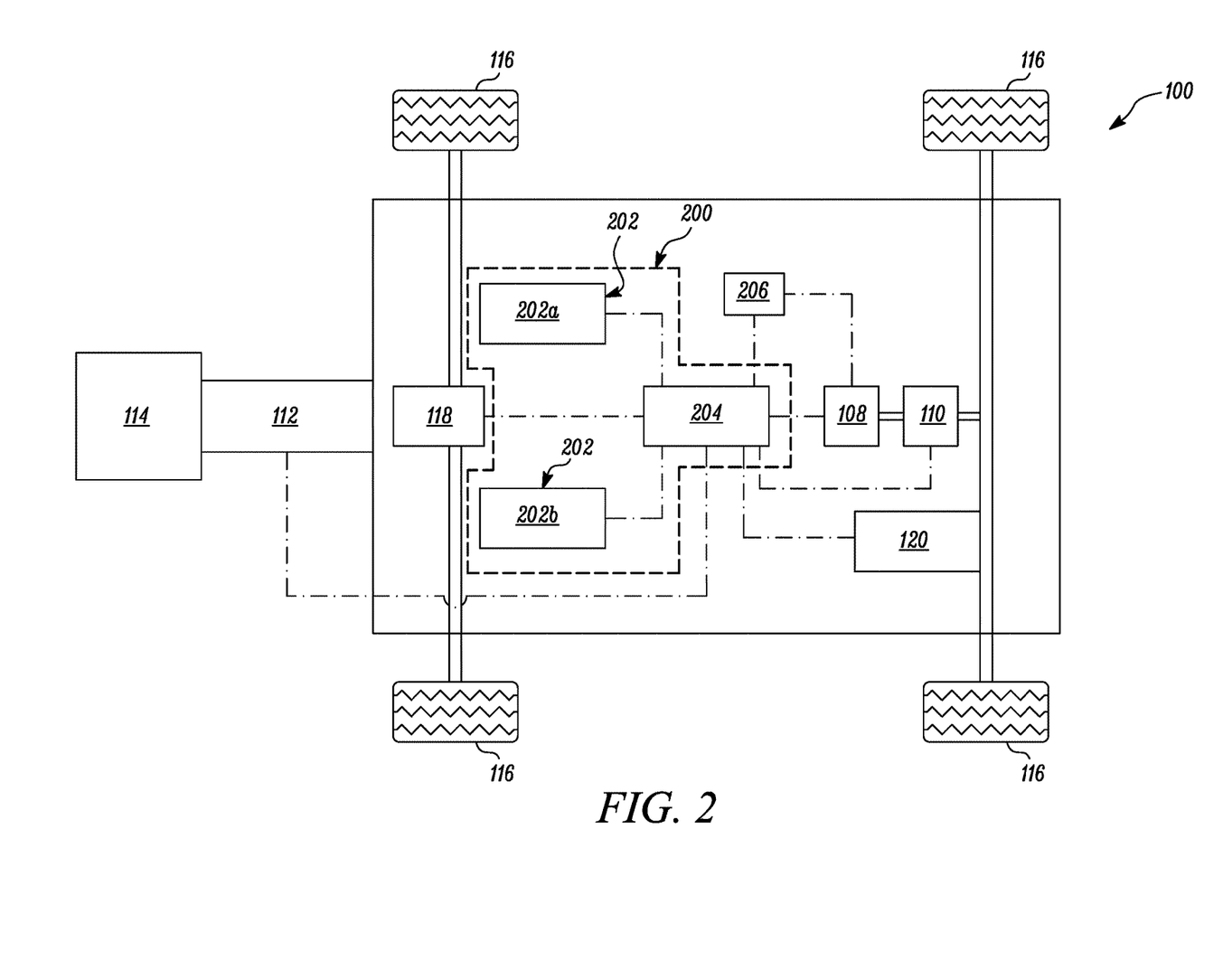
FIG. 2 is a schematic of a perception system for controlling operation of the exemplary machine of FIG. 1, in accordance with embodiments of the present disclosure.

Referring to FIGS. 1 and 2, the machine 100 may include a frame 106 for supporting thereon—a drive system 108, a transmission system 110, an articulation system 112, a work implement 114 for e.g., a drill rig, and multiple ground engaging members 116 for e.g., tracks as shown in FIG. 1. The drive system 108 may include an engine (not shown), an electric motor for e.g., a traction motor (not shown), or both depending on specific requirements of an application. The transmission system 110 may include gears, differential systems, axles, and other components (not shown) that are coupled to the drive system 108 and the ground engaging members 116 of the machine 100. The transmission system 110 is configured to transfer power from the drive system 108 to the ground engaging members 116 and hence, propel the machine 100 on a work surface 122 of the job site 104.

The articulation system 112 may include linkages (not shown) that are coupled to the frame 106 and the work implement 114. As shown in FIG. 1, the work implement 114 is embodied in the form of a drill post. However, in other embodiments, other types of work implements such as, but not limited to, blades, shovels, buckets, scrapers, and the like may be employed by the machine 100 without deviating from the spirit of the present disclosure. Moreover, as the articulation system 112 is operatively driven by the drive system 108, the articulation system 112 can initiate a movement of the work implement 114 relative to the frame 106 of the machine 100 during operation so that the work implement 114 can operatively perform functions such as, but not limited to, raising, lowering, and/or drilling relative to the work surface 122 of the job site 104. Referring to FIG. 1, only one side of the machine 100 is illustrated and hence, only one ground engaging member 116 is visible. However, it should be noted that a similar ground engaging member (not shown) is present on the other side of the machine 100 as well. To that end, it must also be noted that the articulation system 112 disclosed herein can further include appropriate systems, mechanisms, and other movement control devices (not shown) that allow a body 124 of the machine 100 to swivel about a swivel axis 126 defined between the pair of ground engaging members 116 (refer to FIG. 1).

As shown in FIG. 1, the machine 100 may also include a cab 128 having a door 130. The door 130 may be configured to allow access to an operator for entering and exiting the cab 128. As such, the cab 128 could be sized and shaped to house an operator of the machine 100 when operating the machine 100 in a manual or a semi-autonomous mode. However, the present disclosure relates to autonomously actuating movement of the machine 100 in relation to the towing vehicle 102, and in particular, actuating movement of the machine 100 for autonomously loading or autonomously unloading the machine 100 from the towing vehicle 102 in accordance with embodiments disclosed herein.

In an embodiment as shown in FIG. 1, the towing vehicle 102 is embodied in the form of a low-boy trailer having a bed 132 on which the machine 100 is shown loaded. Although a low-boy trailer is disclosed herein, it should be noted that a type or configuration of the towing vehicle 102 is merely exemplary in nature and hence, non-limiting of this disclosure. A person skilled in the art will appreciate that systems and methods disclosed herein can be similarly implemented in other types of machines that require transportation, and also in cases where such machines are being transported using other types of transportation vehicles as well.

The machine 100 includes a perception system shown and generally indicated by numeral '200'. Further explanation pertaining to the perception system 200 will now be made in conjunction with FIG. 2. As shown in FIG. 2, the perception system 200 is disposed in communication with the drive system 108, the transmission system 110, the articulation system 112, the work implement 114, and the ground engaging members 116 of the machine 100. In addition, it is also contemplated that in embodiments of the present disclosure, the perception system 200 may be further disposed in communication with a steering system 118, and a brake system 120 of the machine 100 as shown in FIG. 2. As such, the steering system 118 disclosed herein is coupled to the ground engaging members 116, and subject to commands from the controller 204, can be used to operatively allow a steering of the ground engaging members 116 relative to the frame 106 of the machine 100. Likewise, the brake system 120 is also operatively coupled to the ground engaging members 116, and subject to commands of the controller 204, can be used to operatively retard a rotational speed of one or more ground engaging members 116.

Referring to FIG. 2, the perception system 200 includes multiple sensors 202a, 202b (collectively hereinafter denoted by numeral '202'). Although two sensors 202 are shown in the illustrated embodiment of FIG. 2, in other embodiments, fewer or more number of sensors 202 can be implemented in the perception system 200 depending on specific requirements of an application. These sensors 202 are configured to determine characteristics of an environment 134 associated with the machine 100 (refer to FIG. 1). Such characteristics of an environment 134 may include for e.g., terrain features of a given work site, but is not limited thereto. It is hereby contemplated that in embodiments of the present disclosure, the sensors 202 can further determine structural characteristics of the towing vehicle 102 as well. As such, in embodiments disclosed herein, it should be noted that the structural characteristics of the towing vehicle 102 also form part of the characteristics of the environment 134 associated with the machine 100 and are hence, determined by the sensors 202 for controlling movement of the machine 100 described herein.

In an embodiment of this disclosure, it is contemplated that the sensors 202 could include at least range sensors 202a and perception sensors 202b. Although one range sensor 202a and one perception sensor 202b are shown in the illustrated embodiment of FIG. 2, the sensors 202 could include fewer or more number of each type of sensor 202a, 202b disclosed herein. As an example, the range sensors 202a could include one or more devices such as, but not limited to, hall-effect sensors, a light detection and ranging system (LIDAR), a radio detection and ranging system (RADAR), a sound navigation and ranging system (SO-NAR), and the like. Additionally or optionally, the perception sensors 202b could include one or more visual cameras, but is not limited thereto. Although it is disclosed herein that the sensors 202 could include range sensors 202a and perception sensors 202b, it should be noted that the configurations of the range sensor/s 202a and perception sensors 202b disclosed herein are merely exemplary in nature and hence, non-limiting of this disclosure. One skilled in the art can beneficially contemplate to implement any type of sensors known in the art for performing functions that are consistent with embodiments of the present disclosure.

Perception sensors 202b disclosed herein can obtain data, visual or otherwise, pertaining to the environment 134 in which the machine 100 is currently located. For example, the perception sensors 202b may obtain visual data pertaining to an embankment, a ridge, a hill, and other terrain data that is pertinent to the environment 134 in which the machine 100 is currently located. In addition, the perception sensors 202b are also configured to obtain data, visual or otherwise, pertaining to the structural characteristics of the towing vehicle 102. For example, the perception sensors 202b may obtain visual data pertaining to an overall geometry of the towing vehicle 102. Such geometry could include a width, height, and length of the towing vehicle 102; or even a form or contour of the towing vehicle 102.

In an embodiment of this disclosure, it is contemplated that the sensors 202 can detect the presence of the towing vehicle 102 on the job site 104. Additionally or optionally, the sensors 202 can detect an orientation of the towing vehicle 102 on the job site 104. In a preferable embodiment, the sensors 202 can further detect a loading end 136 of the towing vehicle 102. As shown in the illustrated embodiments of FIGS. 1, 5 and 6, the loading end 136 of the vehicle is characterized by the presence of a ramp 138 whose one end 140 is hingedly supported on the bed 132 of the towing vehicle 102 while another end 142 is configured to rest on the work surface 122 of the job site 104. However, in alternative embodiments, it should be noted that the 'loading end' can be implemented by way of numerous other structures or configurations of the towing vehicle 102 that can be used for allowing the machine 100 to be propelled thereon and hence, to be loaded onto or unloaded from the towing vehicle 102.

In such embodiments, the sensors 202 could include for e.g., a GPS sensor (not shown) and a laser rangefinder (not shown) typically known to one skilled in the art. The GPS sensor and the laser rangefinder could measure the current location of the machine 100 itself and a distance of the machine 100 with the towing vehicle 102 respectively. These measurements may be input into a processor for e.g., processor 302 of FIG. 3, and subject to appropriate computation to estimate an inter-relative positioning of the machine 100 with respect to the towing vehicle 102. Although a GPS sensor and a laser rangefinder is disclosed herein, such configurations of sensors 202 are merely exemplary and hence, non-limiting of this disclosure. It should be noted that it can be contemplated to include any type or configuration of sensors 202 known to persons skilled in the art in lieu of the GPS sensor and the laser rangefinder disclosed herein.

Similarly, it may be understood that various other characteristics associated with the machine 100, the towing vehicle 102, and/or the environment 134 can be contemplated for determination and implementation into various computational processes to perform each of: detect the presence of the towing vehicle 102 in the given job site 104, determine the orientation of the towing vehicle 102 on the job site 104, and detect the loading end 136 of the towing vehicle 102. To that end, in an example, besides the GPS sensor and the laser rangefinder, the sensors 202 could additionally include other types of sensors 202 or devices for e.g., an altimeter for determining other characteristics of the environment 134 for e.g., an altitude of the work surface 122 or the job site 104 on which the machine 100 is located. Additionally or optionally, the altimeter could be configured to determine an altitude of the work surface 122 or the job site 104 on which towing vehicle 102 is located. Such additional characteristics associated with the environment 134 may be implemented for use in appropriate computations to determine subsequent parameters of interest relating to a positioning of the towing vehicle 102, an orientation of the towing vehicle 102, and/or a location of the loading end 136 in the towing vehicle 102 with respect to the machine 100.

As shown in FIG. 2, the perception system 200 further includes a controller 204 that is communicably coupled to each of the sensors 202. The controller 204 is configured to actuate movement of the machine 100 in relation to the towing vehicle 102 based on the characteristics of the environment 134 determined by the sensors 202. As disclosed earlier herein, the structural characteristics of the vehicle also form part of the characteristics of the environment 134 associated with the machine 100. Therefore, in embodiments of the present disclosure, it can be contemplated by persons skilled in the art to provide various inputs in the form of 3-dimensional (3D) terrain maps, GPS data, but not limited thereto to the controller 204. Such inputs could be pre-fed into the controller 204. In addition to the pre-fed input/s, signals could be provided, in real-time, from the sensors 202 to the controller 204 for actuating movement of the machine 100 in relation to the towing vehicle 102.

The controller 204 disclosed herein could include various software and/or hardware components that are configured to perform functions consistent with the present disclosure. As such, the controller 204 of the present disclosure may be a stand-alone controller 204 or may be configured to co-operate with an existing electronic control module (ECU) 206 of the machine 100 to perform functions consistent with the present disclosure. Further, the controller 204 may embody a single microprocessor or multiple microprocessors that include components for controlling operations of the machine 100 based on sensed characteristics of the environment 134 including, but not limited to, the structural characteristics of the towing vehicle 102. Numerous commercially available microprocessors can be configured to perform the functions of the controller 204. It should be appreciated that the controller 204 could readily be embodied in a general machine 100 microprocessor capable of controlling numerous machine 100 functions. The controller 204 may include a memory, a secondary storage device, a processor, and any other components for running an application. Various other circuits may be associated with the controller 204 such as power supply circuitry, signal conditioning circuitry, solenoid driver circuitry, and other types of circuitry. Various routines, algorithms, and/or programs can be programmed within the controller 204 for execution thereof to actuate movement of the machine 100 in relation to the towing vehicle 102 based on the characteristics of the environment 134 determined by the sensors 202.

In embodiments of the present disclosure, the controller 204 is also configured to determine a path of travel for the machine 100 on the basis of the determined characteristics of the environment 134. Further, in one embodiment, the sensors 202 may be configured to beneficially detect obstacles associated with the towing vehicle 102. In such an embodiment, the controller 204 is further configured to determine a path of travel for the machine 100 on the basis of the detected obstacles. For example, the sensors 202 may detect the presence of a side rails 506 (shown in the illustrated embodiments of FIGS. 5 and 6) on the towing vehicle 102. The controller 204 may accordingly navigate the machine 100 by appropriately commanding the drive system 108, the steering system 118, the braking system, and the articulation system 112 so that the machine 100 is avoided from coming into contact or colliding with the side rails 506 of the towing vehicle 102.

For the purposes of the present disclosure, the terms "obstacles' disclosed herein can be regarded as being inclusive of obstacles in the environment 134 and also obstacles presented by the towing vehicle 102 itself to the movement of the machine 100. Moreover, although it is disclosed herein that the side rails 506 are obstacles presented by the towing vehicle 102 to the machine 100, various other objects and/or structures present in the environment 134 can additionally be regarded as falling within the purview of the terms 'obstacles' disclosed herein. For example, a width and/or length of the bed 132 in the towing vehicle 102 may present constraints or limitations to the movement of the machine 100 when loading or unloading the machine 100 from the towing vehicle 102 and hence, spaces beyond such width and/or length of the bed 132 can also be categorically understood as being representative of 'obstacles' by the controller 204 of the present disclosure. Hence, it should be noted that one or more determined characteristics of the environment 134 including, but not limited to, structural characteristics of the vehicle can also manifest themselves into 'obstacles' with regards to a movement of the machine 100 relative to the towing vehicle 102. Notwithstanding anything contained in this document, persons skilled in the art will therefore acknowledge that the 'obstacles' can be any type of obstacle obtained during a determination of the characteristics associated with the environment 134, such determined characteristics of the environment 134 also including one or more structural characteristics of the towing vehicle 102.

The controller 204 disclosed herein may also be implemented with suitable algorithms/software/look-up tables/trial runs/test data/experimental data and the like to determine the path of travel for the machine 100 and thereafter, navigate the machine 100 in accordance with the determined path of travel for the machine 100. Although the drive system 108, the steering system 118, the braking system, and the articulation system 112 are disclosed herein, it should be noted that the machine 100 could, additionally or optionally, include various components other than that described above, and explanation to such components may have been omitted for the sake of brevity in this document, and also for the sake of simplicity in understanding the present disclosure. However, it is to be noted that such components of the machine 100 can be disposed in communication with the controller 204 for controlling an operation of such components and therefore, assist in controlling a movement of the machine 100. As such, it is contemplated that in various embodiments herein, the controller 204 is configured to selectively control an operation of at least the drive system 108, the steering system 118, the brake system 120, and the articulation system 112 of the machine 100 based on the characteristics of the environment 134 determined by the sensors 202.

Figure 3:
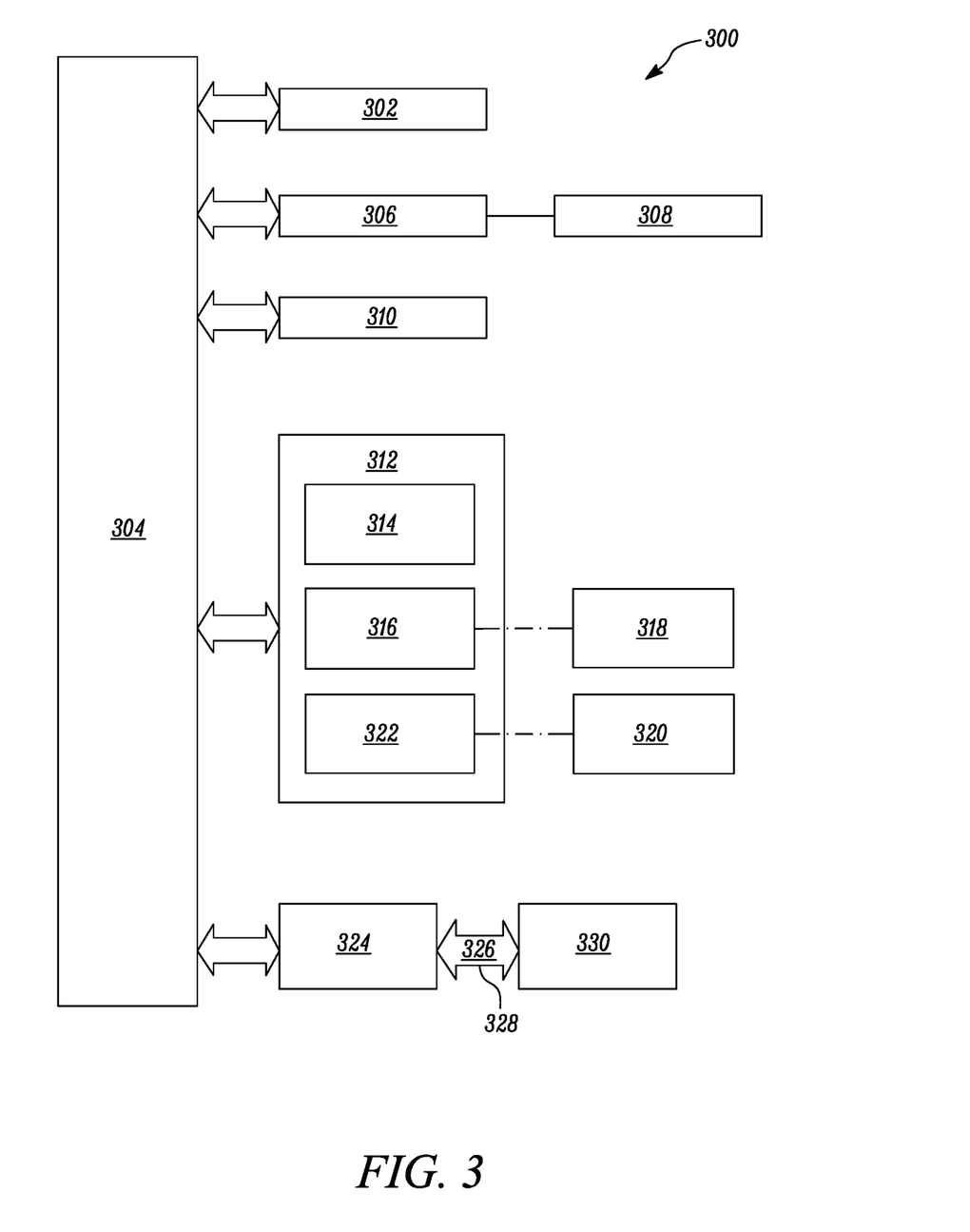
FIG. 3 is an exemplary low-level implementation of the perception system of FIG. 2 for controlling operation of the exemplary machine of FIG. 1, in accordance with embodiments of the present disclosure.

FIG. 3 is an exemplary low-level implementation of the perception system of FIG. 2 for controlling operation of the exemplary machine of FIG. 1 in accordance with embodiments of the present disclosure. For the sake of simplicity in this document, the low-level implementation of the system will hereinafter be referred to as 'a computer system' and designated with similar reference numeral increased by 100 i.e., reference numeral '300').

The present disclosure has been described herein in terms of functional block components, modules, and various processing steps. It should be appreciated that such functional blocks may be realized by any number of hardware and/or software components configured to perform the specified functions. For example, perception system 200 may employ various integrated circuit components, e.g., memory elements, processing elements, logic elements, look-up tables, and/or the like, which may carry out a variety of functions under the control of one or more microprocessors or other control devices. Similarly, the software elements of the system 300 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the system 300 may employ any number of conventional techniques for data transmission, signaling, data processing, network control, and/or the like. Still further, the system 300 could be configured to detect or prevent security issues with a user-side scripting language, such as JavaScript, VBScript or the like. In an embodiment of the present disclosure, the networking architecture between components of the system 300 may be implemented by way of a client-server architecture. In an additional embodiment of this disclosure, the client-server architecture may be built on a customizable .Net (dot-Net) platform. However, it may be apparent to a person ordinarily skilled in the art that various other software frameworks may be utilized to build the client-server architecture between components of the system 200 without departing from the spirit and scope of the disclosure.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce instructions which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

The present disclosure (i.e., system 200, system 300, method 400, any part(s) or function(s) thereof) may be implemented using hardware, software or a combination thereof, and may be implemented in one or more computer systems or other processing systems. However, the manipulations performed by the present disclosure were often referred to in terms such as detecting, determining, and the like, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

In accordance with an embodiment of the present disclosure, the present disclosure is directed towards one or more computer systems capable of carrying out the functionality described herein. An example of the computer based system includes the computer system 300, which is shown by way of a block diagram in FIG. 3.

Computer system 300 includes at least one processor, such as a processor 302. Processor 302 may be connected to a communication infrastructure 304, for example, a communications bus, a cross-over bar, a network, and the like. Various software embodiments are described in terms of this exemplary computer system 300. Upon perusal of the present description, it will become apparent to a person skilled in the relevant art(s) how to implement the present disclosure using other computer systems and/or architectures.

Computer system 300 includes a display interface 306 that forwards graphics, text, and other data from communication infrastructure 304 for display on a display unit 308.

Computer system 300 further includes a main memory 310, such as random access memory (RAM), and may also include a secondary memory 312. Secondary memory 312 may further include, for example, a hard disk drive 314 and/or a removable storage drive 316, representing a floppy disk drive, a magnetic tape drive, an optical disk drive, etc. Removable storage drive 316 reads from and/or writes to a removable storage unit 318 in a well-known manner. Removable storage unit 318 may represent a floppy disk, magnetic tape or an optical disk, and may be read by and written to by removable storage drive 316. As will be appreciated, removable storage unit 318 includes a computer usable storage medium having stored therein, computer software and/or data.

In accordance with various embodiments of the present disclosure, secondary memory 312 may include other similar devices for allowing computer programs or other instructions to be loaded into computer system 300. Such devices may include, for example, a removable storage unit 320, and an interface 322. Examples of such may include a program cartridge and cartridge interface (such as that found in video game devices), a removable memory chip (such as an erasable programmable read only memory (EPROM), or programmable read only memory (PROM)) and associated socket, and other removable storage units 320 and interfaces 322, which allow software and data to be transferred from removable storage unit 320 to computer system 300.

Computer system 300 may further include a communication interface 324. Communication interface 324 allows software and data to be transferred between computer system 300 and external devices 330. Examples of communication interface 324 include, but may not be limited to a modem, a network interface (such as an Ethernet card), a communications port, a Personal Computer Memory Card International Association (PCMCIA) slot and card, and the like. Software and data transferred via communication interface 324 may be in the form of a plurality of signals, hereinafter referred to as signals 326, which may be electronic, electromagnetic, optical or other signals capable of being received by communication interface 324. Signals 326 may be provided to communication interface 324 via a communication path (e.g., channel) 328. Communication path 328 carries signals 326 and may be implemented using wire or cable, fiber optics, a telephone line, a cellular link, a radio frequency (RF) link and other communication channels.

In this document, the terms "computer program medium" and "computer usable medium" are used to generally refer to media such as removable storage drive 316, a hard disk installed in hard disk drive 314, signals 326, and the like. These computer program products provide software to the computer system 300. The present disclosure is also directed to such computer program products.

Computer programs (also referred to as computer control logic) may be stored in main memory 310 and/or secondary memory 312. Computer programs may also be received via the communication interface 304. Such computer programs, when executed, enable computer system 300 to perform the functions consistent with the present disclosure, as discussed herein. In particular, the computer programs, when executed, enable processor 302 to perform the features of the present disclosure. Accordingly, such computer programs represent controllers of computer system 300.

In accordance with an embodiment of the present disclosure, where the disclosure is implemented using a software, the software may be stored in a computer program product and loaded into computer system 300 using removable storage drive 316, hard disk drive 314 or communication interface 324. The control logic (software), when executed by processor 302, causes processor 302 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

Various embodiments disclosed herein are to be taken in the illustrative and explanatory sense, and should in no way be construed as limiting of the present disclosure. All numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 4:
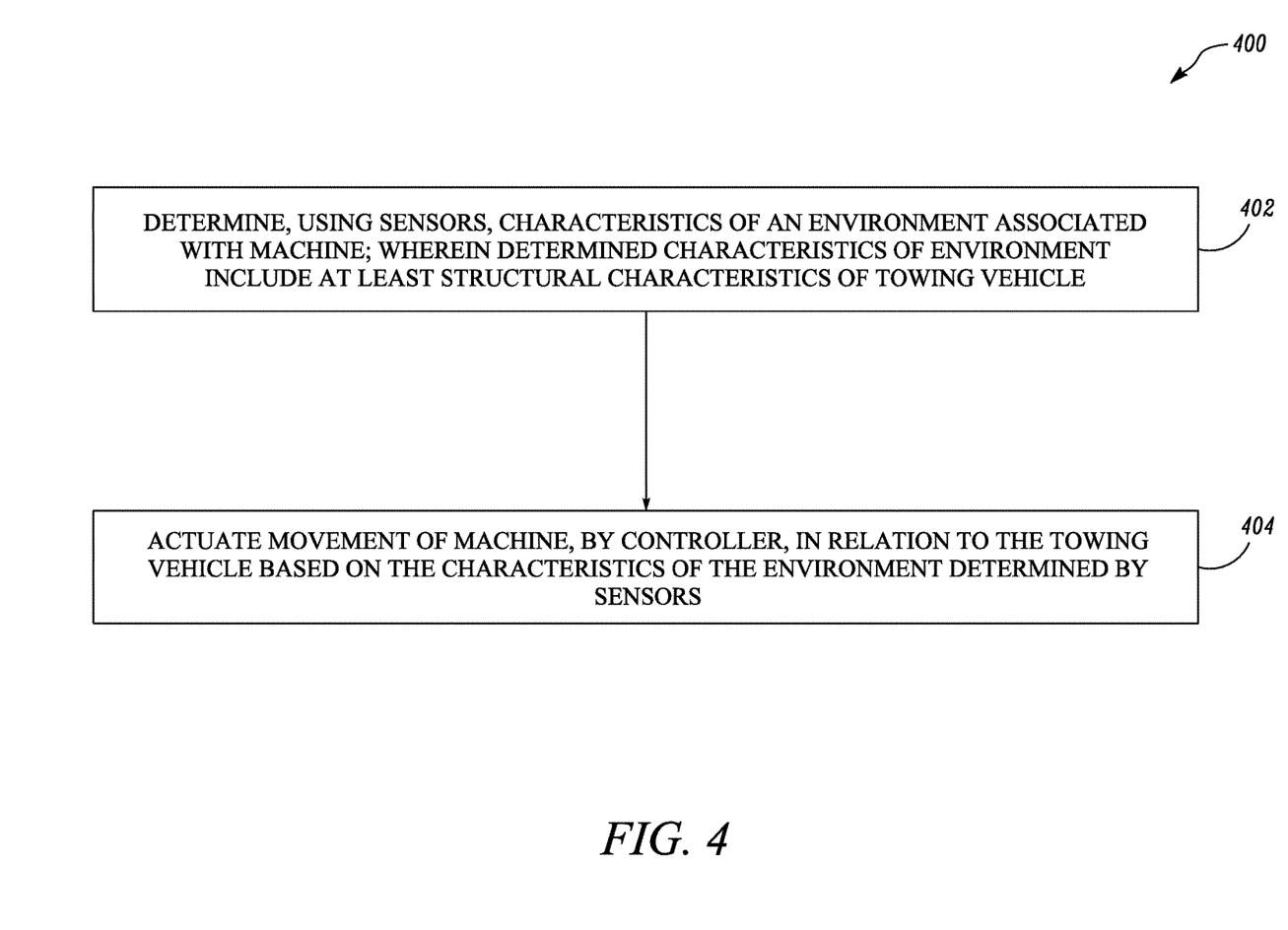
FIG. 4 is a flowchart depicting a method of guiding movement of the exemplary machine of FIG. 1 in relation to the exemplary towing vehicle of FIG. 1, in accordance with an embodiment of the present disclosure.

FIG. 4 is a flowchart illustrating a method 400 for guiding movement of a machine 100 for e.g., the machine 100 in relation to a towing vehicle 102 for e.g., the towing vehicle 102, in accordance with an embodiment of the present disclosure.

At step 402, the method 400 includes determining, by the sensors 202, characteristics of the environment 134 associated with the machine 100, the characteristics of the environment 134 being inclusive of at least the structural characteristics of the towing vehicle 102. At step 404, the method 400 includes actuating movement of the machine 100, by the controller 204, in relation to the towing vehicle 102 based on the characteristics of the environment 134 determined by the sensors 202, the controller 204 being communicably coupled to the sensors 202 as shown in FIG. 2.

In further embodiments of this disclosure, the method 400 includes detecting, by the sensors 202, the presence of the towing vehicle 102 on the job site 104. Additionally or optionally, the method 400 includes determining the orientation of the towing vehicle 102 on the job site 104. Preferably, the method 400 includes detecting, by the sensors 202, the loading end 136 of the towing vehicle 102.

Figure 5:
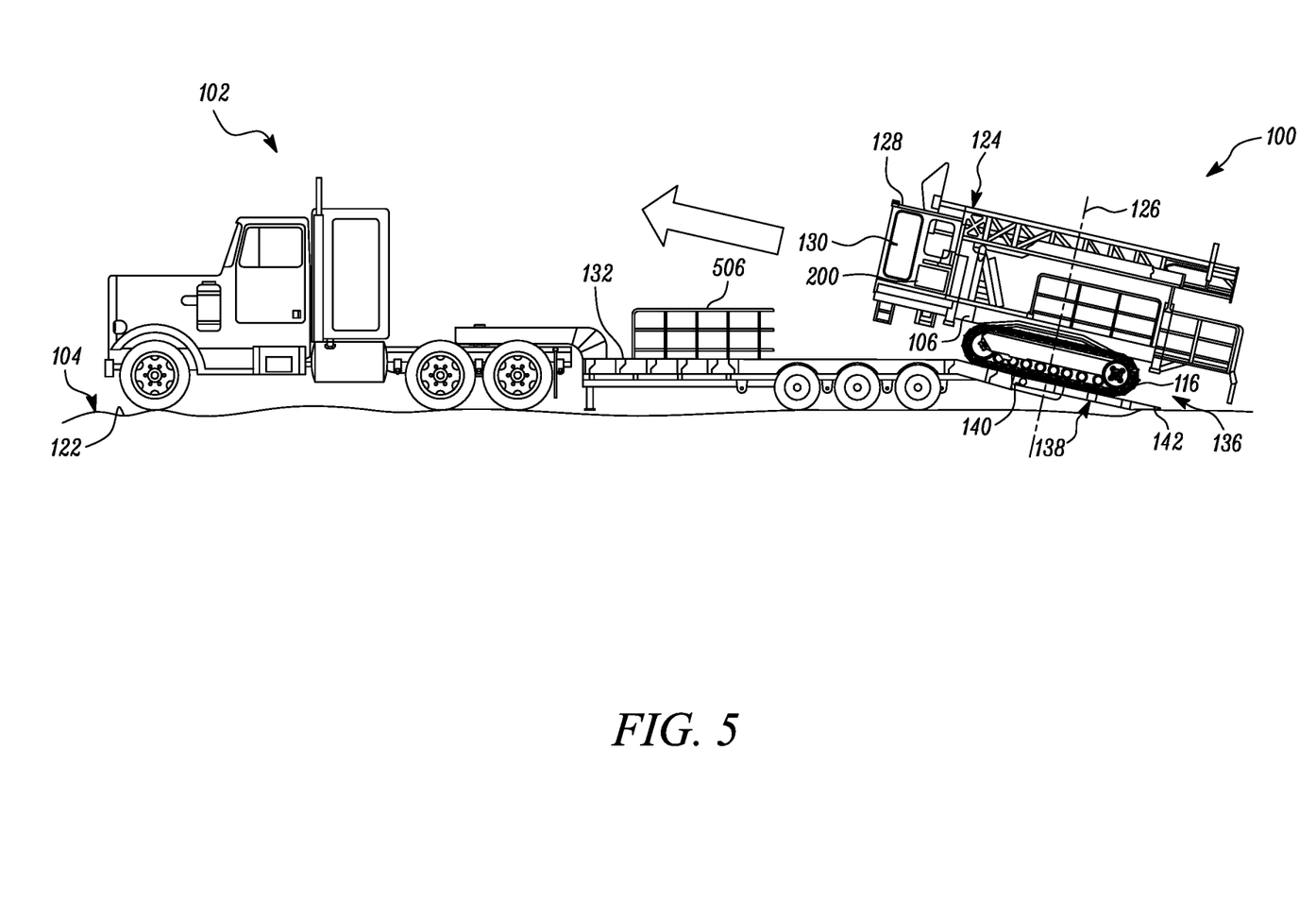
FIG. 5 is a side view of the exemplary machine of FIG. 1 while being loaded onto the exemplary towing vehicle of FIG. 1, in accordance with embodiments of the present disclosure.
Figure 6:
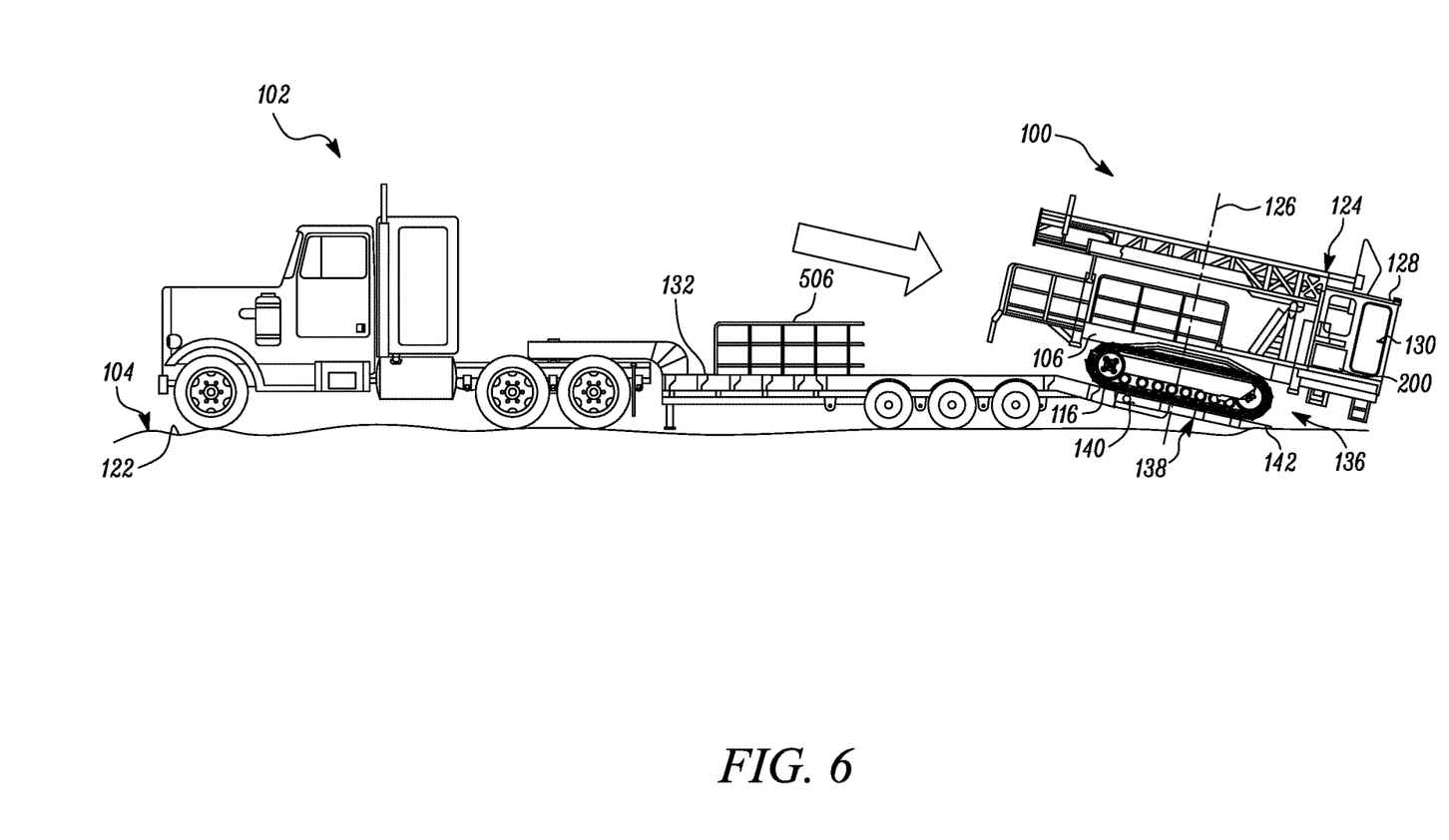
FIG. 6 is a side view of the exemplary machine of FIG. 1 while being unloaded from the exemplary towing vehicle of FIG. 1, in accordance with embodiments of the present disclosure.

Also, upon determination of the characteristics of the environment 134 associated with the machine 100, the method 400 further includes determining, by the controller 204, the path of travel for the machine 100 on the basis of the determined characteristics of the environment 134. In an embodiment as shown in FIG. 5, an operation of the machine 100 is controlled by the controller 204 so as to load the machine 100 onto the bed 132 of the towing vehicle 102. In another embodiment as shown in FIG. 6, the controller 204 controls an operation of the machine 100 for unloading the machine 100 from the bed 132 of the towing vehicle 102, and may hence, assist in the movement of the machine 100 to the work surface 122 of the job site 104.

Embodiments of the present disclosure have applicability for use and implementation in autonomously controlling an operation of the machine based on characteristics of an environment associated with the machine. More particularly, embodiments of the present disclosure relate to autonomously controlling an operation of the machine for loading and unloading the machine onto and from a towing vehicle based on characteristics of an environment associated with the machine. Such characteristics of the environment associated with the machine also include structural characteristics of the machine. The controller, with the help of sensors, can detect the presence of the towing vehicle in the job site, determine the orientation of the vehicle on the job site, and detect the loading end of the towing vehicle. Hence, upon such functions of the perception system, the controller of the perception system actuates movement of the machine in relation to the towing vehicle based on the characteristics of the environment determined by the sensors. More specifically, the controller of the perception system operatively controls the drive system, the steering system, the brake system, the articulation system and one or more ground engaging members of the machine based on the characteristics of the environment determined by the sensors.

With use of embodiments disclosed herein, vendors owning fleets of such machines may do away with operators previously required to transport vehicles to a job site. Moreover, embodiments herein also help vendors from engaging their operators with the added burden of loading and unloading machine/s onto and from a towing vehicle. With implementation of embodiments disclosed herein, several machines known to persons skilled in the art can be beneficially rendered autonomous with regards to the functions of loading and unloading the machines onto and from the towing vehicles. With regards to the drilling industry, use of embodiments disclosed herein can assist many vendors to entail reduced costs, at least in part, due to the autonomous transportation of the machines so as to be loaded onto or unloaded from the towing vehicles.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A perception system for an autonomous machine hauled by a towing vehicle, the system comprising:
   a plurality of sensors configured to determine characteristics of an environment associated with the machine, the characteristics of the environment associated with the machine including at least structural characteristics of the towing vehicle, wherein the plurality of sensors are further configured to detect at least one of:
   a presence of the towing vehicle on a job site;
   an orientation of the towing vehicle on the job site; and
   a loading end of the towing vehicle;
   wherein the plurality of sensors are also configured to detect obstacles associated with the towing vehicle; and
   a controller communicably coupled to the plurality of sensors, the controller configured to actuate movement of the machine in relation to the towing vehicle based on the characteristics of the environment determined by the plurality of sensors and determine a path of travel for the machine on the basis of the detected obstacles.

2. The perception system of claim 1, wherein the controller is configured to determine a path of travel for the machine on the basis of the determined characteristics of the environment.

3. The perception system of claim 1, wherein the plurality of sensors include at least one of: range sensors and perception sensors.

4. The perception system of claim 1, wherein the controller is configured to actuate movement of the machine so as to perform at least one of:
   loading the machine onto the towing vehicle; and
   unloading the machine from the towing vehicle.

5. A machine comprising:
   a frame;
   at least one ground engaging member rotatably coupled to the frame, the at least one ground engaging member configured to selectively propel the machine in relation to a towing vehicle;
   a plurality of sensors disposed on the frame, the plurality of sensors being configured to determine characteristics of an environment associated with the machine, the characteristics associated with the machine including at least structural characteristics of the towing vehicle, wherein the plurality of sensors are further configured to detect at least one of:
   a presence of the towing vehicle on a job site;
   an orientation of the towing vehicle on the job site; and
   a loading end of the towing vehicle;
   wherein the plurality of sensors are configured to detect obstacles associated with the towing vehicle; and
   a controller communicably coupled to the plurality of sensors, the controller configured to actuate movement of the machine in relation to the towing vehicle based on the characteristics of the environment determined by the plurality of sensors and wherein the controller is configured to determine a path of travel for the machine on the basis of the detected obstacles.

6. The machine of claim 5, wherein the machine is at least one of: a wheeled machine, and a tracked machine.

7. The machine of claim 6, wherein the machine is one of: a mobile drill rig, a hydraulic excavator, and an electric rope shovel.

8. The machine of claim 5, wherein the controller is configured to determine a path of travel for the machine on the basis of the determined characteristics of the environment.

9. The machine of claim 5, wherein the plurality of sensors include at least one of: range sensors and perception sensors.

10. The machine of claim 5, wherein the controller is configured to actuate movement of the machine so as to perform at least one of:
    loading the machine onto the towing vehicle; and
    unloading the machine from the towing vehicle.

11. The machine of claim 5 further comprising therein at least one of:
    a drive system coupled to the ground engaging members and configured to operatively rotate the ground engaging members;
    a steering system coupled to the ground engaging members and configured to operatively allow a steering of the ground engaging members relative to the frame of the machine;
    a brake system coupled to the ground engaging members and configured to operatively retard a rotational speed of the ground engaging members;

an articulation system coupled to the frame and operatively driven by the drive system, the articulation system configured to articulate:
a work implement of the machine relative to the frame of the machine, the work implement being pivotally supported on the articulation system; and
a body of the machine to swivel about a swivel axis of the machine.

12. The machine of claim 11, wherein the controller is communicably coupled with actuators associated with one or more of: the drive system, the steering system, the brake system, and the articulation system; the controller being configured to selectively control an operation of the drive system, the steering system, the brake system, and the articulation system based on the characteristics of the environment determined by the plurality of sensors.

13. A method of guiding movement of a machine in relation to a towing vehicle, the method comprising:
determining, by a plurality of sensors, characteristics of an environment associated with the machine and obstacles associated with the towing vehicle, the determined characteristics of the environment including at least structural characteristics of the towing vehicle;
actuating movement of the machine, by a controller, in relation to the towing vehicle based on the characteristics of the environment determined by the plurality of sensors, wherein the controller is communicably coupled to the sensors; and
determining, by the controller, a path of travel for the machine on the basis of the detected obstacles.

14. The method of claim 9 further comprising detecting, by the plurality of sensors, at least one of:
a presence of the towing vehicle on a job site;
an orientation of the towing vehicle on the job site; and
a loading end of the towing vehicle.

15. The method of claim 9 further comprising determining, by the controller, a path of travel for the machine on the basis of the determined characteristics of the environment.

* * * * *